United States Patent

[11] 3,579,077

| [72] | Inventor | Douglas R. G. Cameron<br>Montreal, Quebec, Canada |
|---|---|---|
| [21] | Appl. No. | 823,797 |
| [22] | Filed | May 12, 1969 |
| [45] | Patented | May 18, 1971 |
| [73] | Assignee | Pylon Electronic Development Company<br>Lachine, Quebec, Canada |

[54] REGULATED STATIC DC TO DC CONVERTER START-UP MEANS
6 Claims, 5 Drawing Figs.

[52] U.S. Cl. ................................................ 321/2,
321/10, 321/11, 321/14, 321/18, 321/45
[51] Int. Cl. .................................................. H02m 3/22,
H02m 1/18, H02m 7/52
[50] Field of Search ................................... 321/2, 11,
14, 18, 10, 45 (S)

[56] References Cited
UNITED STATES PATENTS
3,195,036  7/1965  McNulty et al. .............. 321/16

| 3,305,763 | 2/1967 | Kupferberg et al. ........... | 321/18X |
| 3,348,130 | 10/1967 | Jensen ............................ | 321/18X |
| 3,355,653 | 11/1967 | Paradissis ...................... | 321/2 |
| 3,458,796 | 7/1969 | Cassady ......................... | 321/45SUX |

FOREIGN PATENTS
242,242  9/1965  Austria ........................ 321/45SUX

Primary Examiner—William H. Beha, Jr.
Attorney—Fetherstonhaugh and Co.

ABSTRACT: A static DC to DC converter having an output converter stage comprising a full-wave bridge with an SCR in each of two adjacent legs of the bridge. The firing times of the SCR's are controlled by a variable phase synchronous pulse generator controlled by an operational amplifier having one input connected to a reference voltage source and another input connected to feedback means across the converter's output so that the converter's output voltage is regulated. Means are provided for delaying, during start-up, the application of voltage to the pulse generator to prevent heavy current surges through the SCR's. An overshoot voltage clipper is connected across the output of the operational amplifier.

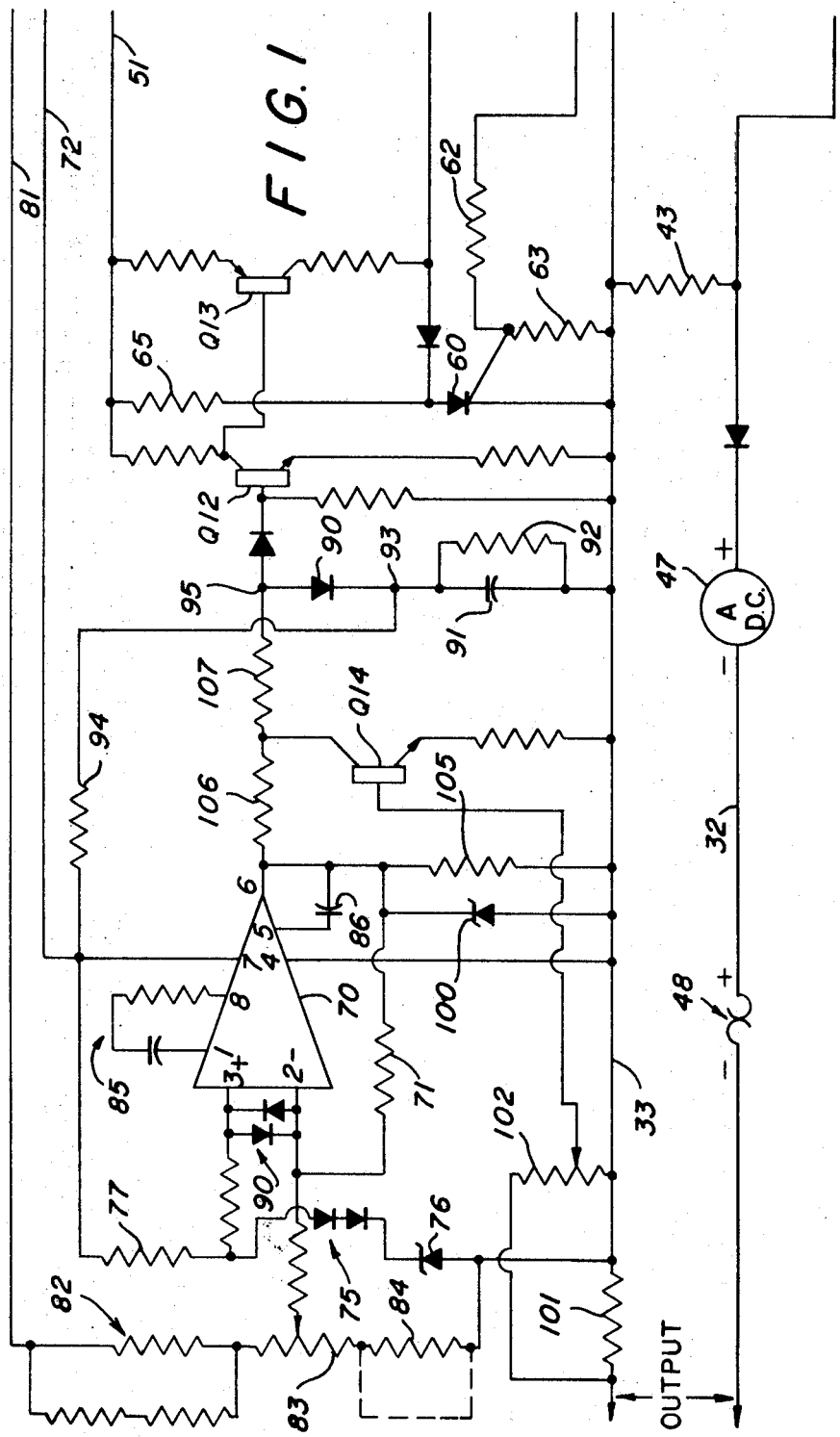

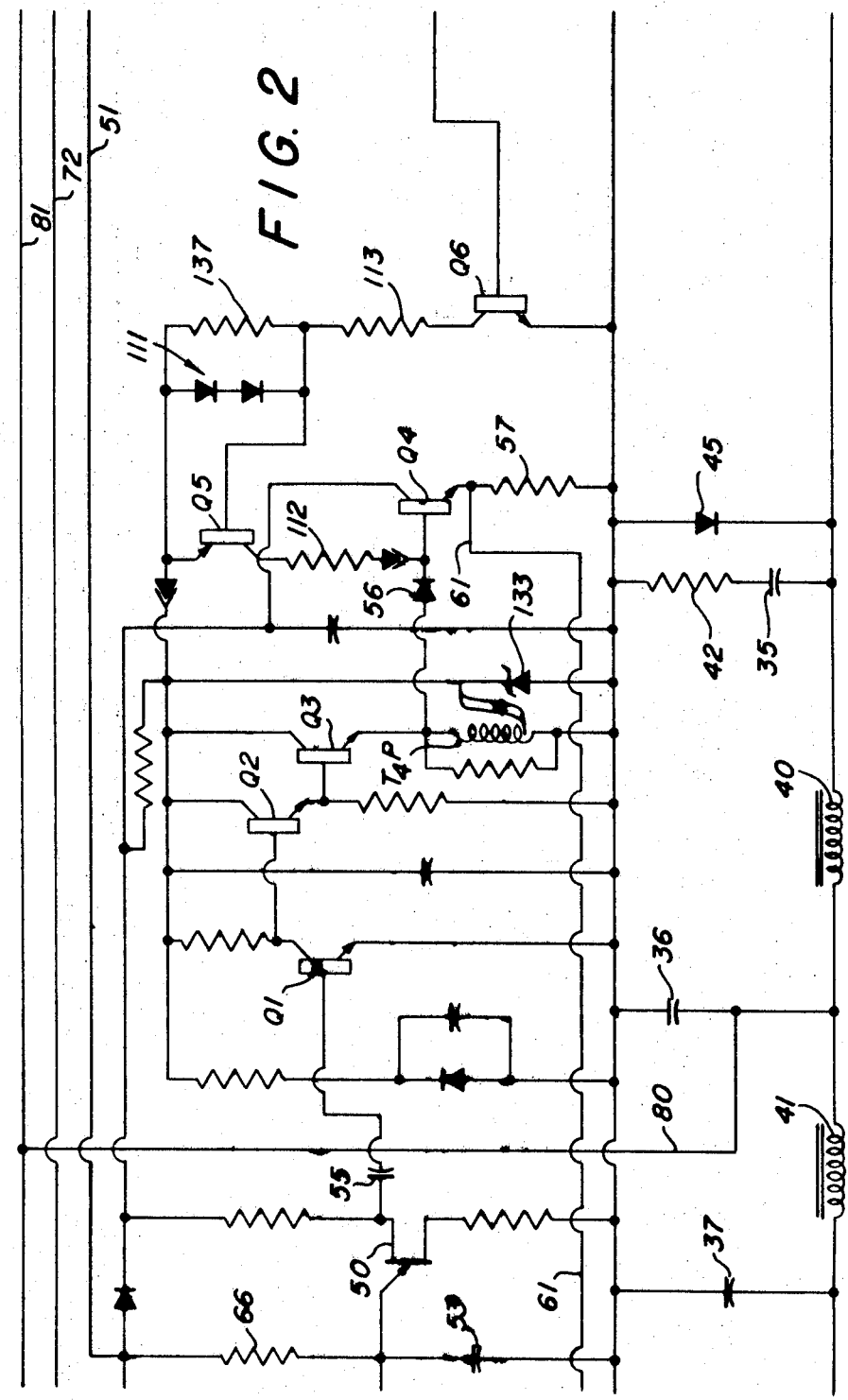

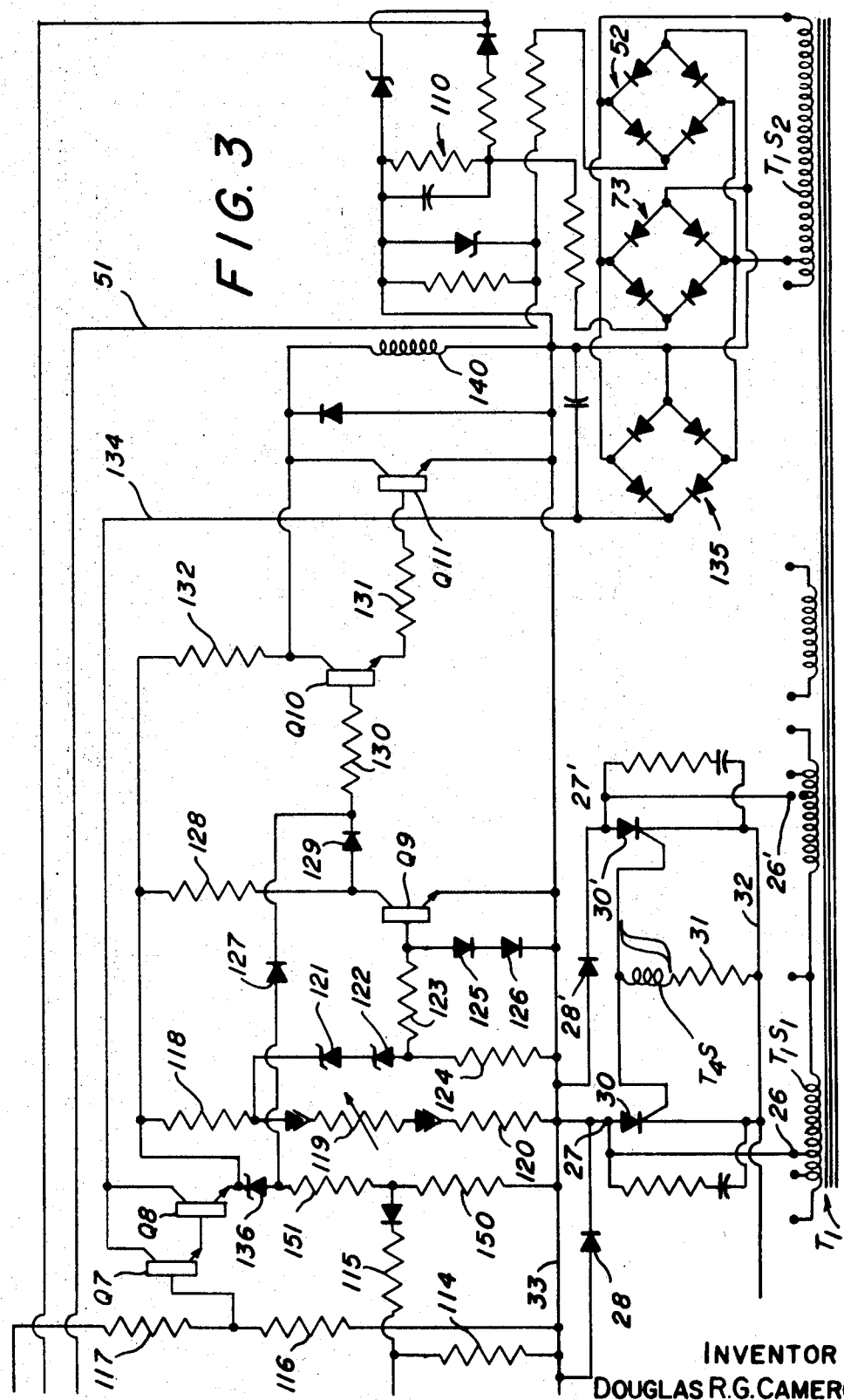

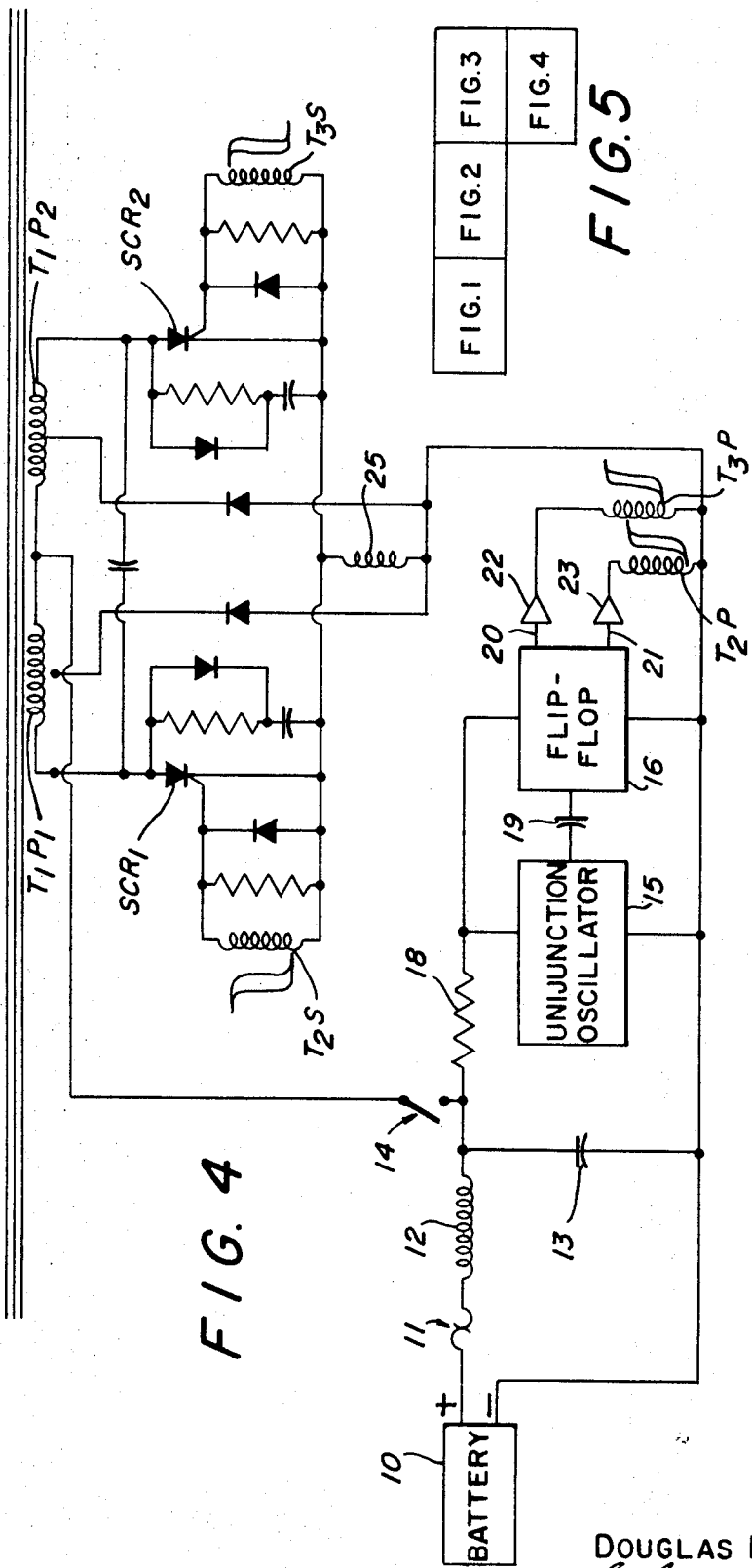

3,579,077

REGULATED STATIC DC TO DC CONVERTER START-UP MEANS

BACKGROUND OF THE INVENTION

This invention relates to a static DC to DC converter.

In certain types of equipment, for example in telephone exchanges, there is provided a battery adapted to provide a DC voltage at a certain voltage level. The battery requires equipment for charging it and regulating its output. Such equipment is costly and requires a certain amount of maintenance. In some cases it is desired to have a different DC voltage than that provided by the battery. Rather than provide a separate battery, it is desirable to be able to derive the second voltage from the first as a second battery would also require equipment for charging it and regulating its output. A possible solution is a motor-generator set but a static DC to DC converter is preferable.

Static DC to DC converters invert the battery voltage or "chop" it into a series of pulses and alternate pulses are fed through two halves of a transformer primary in opposite directions. This results in a square-wave voltage being induced in the transformers secondary and its value depends on the transformer turns ratio. The secondary current may then be rectified and filtered to provide a DC output voltage either higher or lower or even the same as the battery voltage. This DC output voltage may be regulated.

The rectifier may comprise a full-wave bridge having an SCR in each of two adjacent arms. The output can be controlled by varying the time at which pulses are applied to the gates of the SCR's. During start-up, i.e. when the converter is initially switched on, the output filter capacitors are discharged and the SCRs's are, in effect, conducting into a short circuit momentarily. Heavy surge currents can flow through the SCR's and damage or destroy them. Failing this, the input circuit breaker is liable to be tripped open.

SUMMARY OF THE INVENTION

The present invention provides a static DC to DC converter of low weight having automatic means to gradually advance the conduction angle for gating pulses to the SCR's during start-up, i.e. to gradually "phase back" the SCR's.

The static DC to DC converter according to the invention has an output converter stage controlled by pulses from a variable phase synchronous pulse generator which, in turn, is controlled by the output of an operational amplifier having a first input connected to a reference voltage source and a second input connected to feedback means connected across the output of the DC to DC converter. In this manner, variations in the output of the DC to DC converter from a set level cause the output of the operational amplifier to change in a manner such that the output of the variable phase pulse generator affects the output converter stage to bring the output of the DC to DC converter back to the set level.

During start-up of the DC to DC converter, start-up means prevents the initially high output of the operational amplifier from being applied to the input of the variable phase synchronous pulse generator to cause full phaseback of the converter SCR's. Gradually, however, the input to the variable phase synchronous generator is increased until it fully controls the pulse generator.

A preferred embodiment of the invention will now be described in conjunction with the accompanying drawings which are briefly described below.

BRIEF DESCRIPTION OF THE DRAWINGS

FIGS. 1, 2, 3 and 4, together, are a partly block, partly schematic diagram of a static DC to DC converter according to the present invention, and FIG. 5 shows how FIGS. 1, 2, 3 and 4 fit together to form a complete diagram.

DESCRIPTION OF THE PREFERRED EMBODIMENT

FIG. 4 shows the inverter portion of the static DC to DC converter according to the invention. This portion of the arrangement is known and hence need not be explained in detail. However, it is proposed to explain it briefly so that the functioning of the overall arrangement will be immediately apparent.

The converter is powered by a battery 10 having its positive terminal connected through a circuit breaker 11 and filter coil 12 to one end of a capacitor 13. The other end of capacitor 13 is connected to the negative terminal of battery 10. When switch 14 is closed, capacitor 13 is repetitively charged and discharged. It discharges alternately through the two halves of the primary winding of transfer $T_1$, i.e. winding halves $T_1P_1$ and $T_1 P_2$, this being controlled by unijunction oscillator 15 and flip-flop 16. The unijunction oscillator 15 and flip-flop 16 are connected across battery 10 in series with a voltage dropping resistor 18, if necessary. Unijunction oscillator 15 may be set to oscillate at, for example, 800 pulses per second. These pulses are coupled through capacitor 19 to flip-flop 16 which thus produces pulse trains of 400 pulses per second at its two outputs 20 and 21, the two pulse trains being, of course, 180° out of phase with each other. These pulse trains are amplified by amplifiers 22 and 23 and feed the primaries $T_2P$ and $T_3P$ of two pulse transformers having their secondaries $T_2S$ and $T_3S$ connected between the gate and cathode of $SCR_1$ and $SCR_2$, respectively. Considering $SCR_1$, the pulses on $T_2S$ make it conductive so that capacitor 13 discharges through switch 14, winding $T_1P_1$, $SCR_1$ and inductance 25. Similarly, the pulses on $T_3S$ make $SCR_2$ conductive as that capacitor 13 discharges through switch 14, winding $T_1P_2$, $SCR_2$ and inductance 25. There is, of course, sufficient time between adjacent pulses for capacitor 13 to recharge.

With unijunction oscillator 15 operating at 800 pulses per second, the secondary windings of transformer $T_1$ (see FIG. 3) have square wave voltages induced in them of 400 cycles per second. The secondary winding $T_1S_1$ is shown as having some unused taps including an unused center tap but an appropriate pair of taps 26 and 26' are connected to points 27 and 27' on a full wave bridge rectifier comprising two diodes 28 and 28' and two SCR's 30 and 30'.

A secondary winding $T_4S$ of a pulse transformer is connected in series with a resistor 31 between the gates and cathodes of SCR's 30 and 30'. The gates and cathodes of SCR's 30 and 30' are connected together as shown. The cathodes of the SCR's are connected to line 32 and the anodes of diodes 28 and 28' are connected to line 33. Line 33 comprises a common negative output lead while line 32 forms the positive output lead. Following the full-wave bridge rectifier is a filter section including capacitor 36 and 37, inductances 40 and 41 and resistor 43. Diode 45 aids in further smoothing the output from the bridge rectifier. A DC ammeter 47 may be included in line 32 as well as a circuit breaker 48 (FIG. 1). Resistor 42 in series with capacitor 35 suppress voltage spikes.

It will be readily appreciated by those skilled in the art that the output of the full-wave bridge rectifier can be controlled by controlling the timing the pulses applied to the gates of SCR's 30 and 31 by transformer secondary $T_4S$. For example, consider a positive pulse applied to the anode of SCR 30: it has a certain duration and if SCR 30 is triggered near the end of the pulse only a small amount of power will flow through SCR 30: if SCR 30 is triggered near the beginning of the pulse a large amount of power will flow through SCR 30. Similar comments apply to SCR 30'. Thus power flow to the output of the converter is controlled by controlling the phase of the pulses applied to the gates of SCR's 30 and 30'.

This control is achieved in the present invention by controlling a variable phase synchronous pulse generator comprising a unijunction transistor 50 (FIG. 3) and associated circuit elements. Referring to FIG. 2 the output of the variable phase synchronous generator feeds the primary winding $T_4P$ of a pulse transformer which, as mentioned previously, has its secondary winding T₄S connected so as to trigger SCR's 30 and 30' (FIG. 3).

The variable phase synchronous pulse generator is energized over a line 51 connected to a four-diode full-wave bridge rectifier 52 energized by secondary winding $T_1S_2$ on transformer $T_1$. With the unijunction oscillator 15 (FIG. 4) operating at 800 pulses per second the output of bridge rectifier 52 is 800 pulses per second of unidirectional current (commonly called "pulsating"). Thus the timing capacitor 53 for unijunction transistor 50 has 800 pulses per second applied to it. By controlling the rate of charging of timing capacitor 53, one can control the time of firing of unijunction transistor 50. Hence the term "variable phase." The pulse applied to line 51 are synchronized with those applied to the anodes of SCRs's 30 and 30'. It should now be clear why the pulse generator is termed a variable phase synchronous pulse generator. It automatically resets itself at the end of each pulse over line 51.

When the charge on capacitor 53 reaches a predetermined level, unijunction transistor 50 is triggered into conduction or "fired." This results in a negative pulse being applied through capacitor 55 to the base of normally conducting transistor $Q_1$ which then "snaps" off, i.e. turns off very quickly. This results in the collector voltage of $Q_1$ immediately rising and this collector voltage is fed to the base of transistor $Q_2$ which then conducts a pulse to the base of transistor $Q_3$ which, in turn, conducts a pulse which is applied to the primary winding $T_4P$ of the pulse transformer. A pulse is then induced in the secondary winding $T_4S$ of the pulse transformer and applied to the gates of SCR's 30 and 30'. The gates of SCR's 30 and 30' are thus pulsed 800 times a second but only one of the two SCR's is forward biased at any given time and capable of being triggered into conduction. This is clear because the anodes of SCR's 30 and 30' are pulsed 400 times a second by voltages 180° out of phase with each other. $Q_2$ and $Q_3$ comprise a Darlington amplifier, a well known circuit configuration.

Unijunction 50 could fire more than once during a single pulse applied over line 51 and also applied to SCR 30 or SCR 30'. If this were allowed to happen, unnecessary pulses would be applied to the gates of SCR's 30 and 30'. The present invention includes means to prevent this (a "killer" circuit), as follows. The emitter of transistor $Q_3$ is coupled through diode 56 to the base of normally off transistor $Q_4$. When $Q_3$ conducts a pulse $Q_4$ becomes conductive through resistor 57. The voltage at the upper end of resistor 57 therefore rises and this is passed to the gate of SCR 60 via line 61 and the voltage divider comprising resistors 62 and 63 so that SCR 60 is triggered on. This results in the emitter of unijunction transistor 50 being clamped at ground potential for the remainder of the pulse applied over line 51 at the end of which pulse SCR 60 loses its holding current and releases unijunction 50 for the next cycle. When SCR 60 ties the emitter of unijunction 50 to ground it is obvious that unijunction 50 cannot fire. Resistor 65 may be selected to have a value just low enough that SCR 60 is maintained conductive after triggering until the pulse on line 51 ends.

If timing capacitor 53 charges rapidly, unijunction 50 will fire near the beginning of a pulse applied to the anodes of SCR's 30 and 30' so that maximum or near maximum power transfer to the output occurs. If timing capacitor 53 charges slowly, unijunction 50 will fire near the end of a pulse applied to the anodes of SCR's 30 and 30' so that little power transfer to the load takes place. Power transfer is thus increased by "phasing back" the time of firing of unijunction 50. This is somewhat analogous to opening the throttle on an engine. The conduction angle vs. power output characteristic is approximately linear.

Resistor 66 in series with timing capacitor 53 is what may be termed a "tare" resistor. Assume for the moment that the only source of charging current for timing capacitor 53 is from line 51 through resistor 66. Resistor 66 is selected to be of such a value that timing capacitor 53 will charge sufficiently to fire unijunction 50 slightly before the pulse on line 51 ends. This means that SCR's 30 and 30' are triggered near the end of pulses applied to their anodes and that the output from the converter is very low.

To increase the power output it is necessary to "phase back" the triggering of SCR's 30 and 30' to a time nearer the beginning of pulses applied to their anodes. This is done by increasing the charging rate of timing capacitor 53 by means to be described below.

Referring to FIG. 1 it is seen that the converter includes amplifying means 70. This is an integrated circuit commonly referred to as a high performance operational amplifier. A suitable one is the μA709C available, for example, from Fairchild Semiconductor, a division of Fairchild Camera and Instrument Corporation. It comprises a high open loop gain amplifier (about 30,000) but is modified here by negative feedback resistor 71 to have a low gain of about 10. The amplifier 70 is an operational amplifier having a reference input marked 3+ in FIG. 1 and a feedback input marked 2−. Power for the integrated circuit 70 is supplied over line 72 to terminal 7 from full-wave bridge rectifier 73 connected across transformer winding $T_1S_2$ (FIG. 3). The reference input 3+ is provided with a positive reference voltage of about +8.5 volts by diodes 75 in series with Zener diode 76, these being energized from line 72 via resistor 77.

Terminal 2− of amplifying means 70 is fed feedback voltage from the output filter over lines 80 (FIG. 2) and 81 through a temperature compensated resistor 82 and a potentiometer 83 in series. The tap on potentiometer 83 may be varied to change the output voltage of the converter.

An input frequency compensating "pad" 85 is connected between terminals 1 and 8 of amplifier 70 and a capacitor 86 is provided between terminals 5 and 6 to provide output frequency compensation. Suitable input and output compensation component values may be selected from a graph of closed-loop voltage gain v. frequency supplied with the μA709C integrated circuit.

Amplifier 70 is connected "single-ended," i.e. terminal 4 is grounded to line 33 and the output at terminal 6 of amplifier 70 is always positive. Terminal 7 is the positive supply terminal of amplifier 70 and receives positive voltage from bridge rectifier 73 (FIG. 3) over line 72. Diodes 90 are provided between the input terminals 3+ and 2− to clip transient overdrive voltages which would destroy the integrated circuit.

Variations in the setting of the tap on potentiometer 83 cause voltage variations on input 2− so that the output voltage at terminal 6 varies. These variations at output 6 are amplified by transistors Q12 and Q13 resulting in variations in the rate of charging of timing capacitor 53 (FIG. 2) and hence variations in the conduction angle and resultant output voltage of the converter. If the output voltage of the converter should tend to increase, or decrease, this is sensed by operational amplifier 70 via the tap on potentiometer 83 and causes the rate of charging of timing capacitor 53 to decrease or increase so as to bring the converter output voltage back to a set level. Transistors Q12 and Q13 comprise a linear current amplifier. The collector current of transistor Q13 is almost linearly proportional to the voltage applied to the base of transistor Q12. This provides what is termed "series transistor" control of phase angle.

It will be appreciated that during start-up of the converter, i.e. when switch 14 (FIG. 4) is first closed, the capacitors 36 and 37 in the output filter will not be charged. Furthermore, there will be no feedback voltage applied to input 2− of operational amplifier 70 whereas the fixed input to the 3+ input will be established immediately. Without certain features to be described below this would result in a large output on terminal 6 which, amplified by transistors Q12 and Q13, would immediately charge timing capacitor 53 sufficiently to fire unijunction 50. Firing of unijunction transistor 50 would trigger SCR's 30 and 30' which would conduct heavily into the uncharged filter capacitors which would momentarily constitute an effective short circuit across SCR's and 30'. Input circuit breaker 11 would likely open and there would be a danger of the heavy current damaging or destroying SCR's 30 and 30'. The present invention eliminates this problem in a manner which will now be described.

Referring to FIG. 1, note that across the input of transistor Q12 there is connected a diode 90 in series with a capacitor 91 across which a resistor 92 is connected. The junction 93 between diode 90 and capacitor 91 is connected via resistor 94 to line 72 which is energized by filtered DC from bridge 73, FIG. 3, the filter being generally indicated by reference numeral 110. When the converter is initially turned on capacitor 91 begins to charge from two sources, viz. the output of amplifier 6 and line 72 via resistor 94. The initial high surge of current from amplifier 70 at switch-on is absorbed by capacitor 91 and normally cutoff transistor Q12 remains cutoff. However, as the charge gradually builds up on capacitor 91, some current flows to the base of transistor Q12 and it becomes more and more conductive until finally capacitor 91 becomes charged from line 72 to a voltage higher than that on the anode of diode 90, i.e. at point 95. When this happens, diode 90 is back-biased and capacitor 91 ceases to draw current from the output of amplifier 70 which is then all applied to the base of transistor Q12 so that, in the manner described above, the charging time of timing capacitor 53 is influenced in the normal manner and SCR's 30 and 30' are "phased back" an amount depending on the setting of the tap on potentiometer 83. This happens gradually in that, as the voltage at point 93 exceeds more and more the voltage at point 95, more and more voltage is applied to the base of transistor Q12 until full control by amplifier 70 occurs. Phase back during start-up is thus gradual and follows roughly a ramp function. This ensures a smooth buildup of the output voltage of the converter.

Zener diode 100 is an overshoot clipper which clips the voltage output of amplifier 70 at some suitable voltage, e.g. 13 volts. Thus protection is afforded the circuit, including SCR's 30 and 30', if for any reason the output of amplifier 70 should suddenly increase abnormally. Zener diode 100 determines the maximum amount of phase back of SCR's 30 and 30' by limiting the maximum output of amplifier 70.

FIG. 1 shows a resistor 101 in the common line 33 and a potentiometer 102 connected across it. This arrangement provides for current limiting. When the current exceeds a certain level determined by the setting of potentiometer 102, normally cutoff transistor Q14 is biased into conduction to shunt part of the output of amplifier 70 with results that will be obvious in view of the foregoing.

The output of amplifier 70, during normal operation, drives the linear amplifier stages comprising transistors Q12 and Q13 so that the charge delivered to timing capacitor 53 is proportional to the output of amplifier 70. An increase in output results in an advance in the time of firing of SCR's 30 and 30', i.e. an increased phase back.

Resistor 105 is a ballast or tie-down resistor on the output of amplifier 70.

Resistor 106 is a current limit resistor for the integrated circuit amplifier 70.

Resistor 107 attenuates the base-emitter circuit of transistor Q12 and aids in gain set and linearization of the trigger system.

Resistor 92 in parallel with capacitor 91 is a "bleed" resistor which provides a standoff voltage about 2 volts in excess of maximum control voltage excursion; it also bleeds the charge off capacitor 91 in less than 2.5 seconds so as to reprogram for restartup in case of breaker trip due to overload.

An alarm system is preferably provided to turn on a red light or ring a bell, etc. to indicate low or high voltage. The system used here also includes an override runaway limiter to stop firing pulses to the converter SCR's 30 and 30' if, for some reason, the output voltage should become excessively high.

Referring to FIG. 3, the full-wave bridge 135 supplies voltage to the collectors of cascaded transistors Q7 and Q8. The base of transistor Q7 receives a voltage fed back over lines 80 and 81. Resistors 116 and 117 comprise a feedback voltage sampling divider. The base of Q7, connected to the junction of resistors 116 and 117, receives, for example 0.18$V_f$ where $V_f$ means feedback volts. For a nominal output of 130 volts, $V_f$ =23.4 volts.

Transistor Q9 functions as a switch by virtue of its collector voltage in the off or on state. Resistor 118, Zener diodes 121 and 122, and resistor 124 comprise a voltage spillover circuit. That is, when 0.18$V_f$ is higher than the Zener voltages of 121 and 122 in series, some current will get through to the base of Q9 via resistor 118, Zener diodes 121 and 122 and resistor 123. That will cause Q9 to saturate and back bias diode 129 so that it cannot drive the alarm switch comprising Q10, resistors 130 and 131 and Q11. Diode 127 is a high alarm OR gate as compared with diode 129 which functions as a low level alarm OR gate. If either are forward biased they will cause Q11 to switch and clamp the relay coil 140. Q10 and Q11 comprise a Darlington driver switch. Q10 simply provides a relatively high impedance to actuation. When Q11 saturates or switches, it clamps the relay coil so as to change armature position.

To summarize the two switching functions:

a. When 0.18$V_f$ exceeds the Zener voltage of Zener diode 136, it will spill over and provide forward bias to diode 127, otherwise called a "one" output. Thus current will flow via diode 127 and resistor 130 to the base of Q10. Q10 drives Q11 which clamps the relay coil.

b. When 0.18$V_f$ becomes less than normal, Zeners 121 and 122 will cease conducting and Q9 will not receive base bias and thus switch off. Q9's collector voltage will rise to forward bias diode 129 and drive Q10, Q11 as described above in (a). Resistor 119 is adjustable so that the voltage applied to Zener diodes 121, 122 is adjustable. The point at which the low level alarm is actuated is thus adjustable.

The high level alarm is set by the choice of Zener diode 136.

The runaway limiter will now be described:

At some voltage greater than the Zener voltage of 136, Q6 will be caused to switch by means of network 151, 150, 133 and 115. When high voltage occurs or when 0.18$V_f$ increases past alarm level, Zener 136 will pass enough current to activate Q5 by virtue of divider 137, 113 and the transistor action of Q6. The forward base-emitter bias then created will allow Q5 to feed direct current to the base of Q4, the one-shot feedback transistor. The gate of the killer SCR, SCR 60, then receives signals that completely inhibit unijunction 50 and prevent any firing pulses from reaching the converter SCR's 30 and 30'.

I claim:

1. In a static DC to DC converter having an output converter stage controlled by pulses from a variable phase synchronous pulse generator, the improvement wherein said variable phase synchronous pulse generator is controlled by the output of an operational amplifier having a first input connected to a reference voltage source and a second input connected to feedback means connected across the output of said DC to DC converter whereby a variation in the output of said DC to DC converter from a set level causes the output of said operational amplifier to change in a manner such that the output of said variable phase pulse generator effects the output converter stage to bring the output of the DC to DC converter back to said set level, said converter including start-up means which, during start-up of the DC to DC converter, prevents the initially high output of the operational amplifier from being applied to the variable phase synchronous pulse generator, but gradually increases the proportion of the output of the operational amplifier applied to the variable phase synchronous pulse generator until, after a short time delay, the full output of the operational amplifier is applied to the variable phase synchronous generator, said start-up means comprising a diode and a capacitor connected in series combination across the output of said operational amplifier, charging means being connected to said capacitor whereby, during said time delay, the capacitor charges to a voltage equal to the output of said operational amplifier and then back-bias said diode, whereupon the full output of said operational amplifier is applied to the input of said variable phase synchronous pulse generator.

2. A static DC to DC converter as claimed in claim 1 and having means to ensure a predetermined minimum output from the variable phase synchronous pulse generator in the absence of an input thereto from the operational amplifier.

3. A static DC to DC converter as claimed in claim 1 wherein said amplifier has a very high gain which is reduced to a low value by negative feedback comprising a resistor connected between the output and said second input of said operational amplifier.

4. A static DC to DC converter as claimed in claim 1 wherein a bleed resistor is connected across said capacitor.

5. A static DC to DC converter as claimed in claim 1 and further comprising means connected across the output of said operational amplifier for preventing the voltage applied to said variable phase synchronous generator from exceeding a predetermined maximum.

6. A static DC to DC converter as claimed in claim 1 and further comprising a Zener diode connected across the output of said operational amplifier for preventing the voltage applied to said variable phase synchronous generator from exceeding a predetermined maximum.